No. 895,512. PATENTED AUG. 11, 1908.
C. THIBODEAU & W. W. HARRIS.
CIRCULAR LOOM.
APPLICATION FILED NOV. 18, 1904.

No. 895,512. PATENTED AUG. 11, 1908.
C. THIBODEAU & W. W. HARRIS.
CIRCULAR LOOM.
APPLICATION FILED NOV. 18, 1904.

No. 895,512. PATENTED AUG. 11, 1908.
C. THIBODEAU & W. W. HARRIS.
CIRCULAR LOOM.
APPLICATION FILED NOV. 18, 1904.

No. 895,512. PATENTED AUG. 11, 1908.
C. THIBODEAU & W. W. HARRIS.
CIRCULAR LOOM.
APPLICATION FILED NOV. 18, 1904.

No. 895,512. PATENTED AUG. 11, 1908.
C. THIBODEAU & W. W. HARRIS.
CIRCULAR LOOM.
APPLICATION FILED NOV. 18, 1904.

UNITED STATES PATENT OFFICE.

CHARLES THIBODEAU, OF SOMERVILLE, AND WINFRED W. HARRIS, OF WINTHROP, MASSACHUSETTS, ASSIGNORS TO EMMA M. WILSON, OF CHELSEA, MASSACHUSETTS.

CIRCULAR LOOM.

No. 895,512.　　　　Specification of Letters Patent.　　　　Patented Aug. 11, 1908.

Application filed November 18, 1904. Serial No. 233,318.

*To all whom it may concern:*

Be it known that we, CHARLES THIBODEAU and WINFRED W. HARRIS, of Somerville and Winthrop, in the counties of Middlesex and Suffolk, respectively, and State of Massachusetts, have invented certain new and useful Improvements in Circular Looms, of which the following is a specification.

This invention relates to a new and improved circular loom and consists, among other features, of weaving mechanism carried and operated in a vertical plane about a horizontal throat or form, whereby tubes of indefinite length may be made.

Fig. 6ª is a detail view, showing the connection between the contact pins and the copper ring carried by the warp ring. Fig. 7ª is a detail view of one of the contact fingers carried by the warp ring. Fig. 11ª is a detail view of the casting carrying the feed wheels and their gears.

The same letters of reference indicate the same parts in all of the figures.

1 represents suitable standards or legs arranged to support the framework of the machine.

Figure 1:
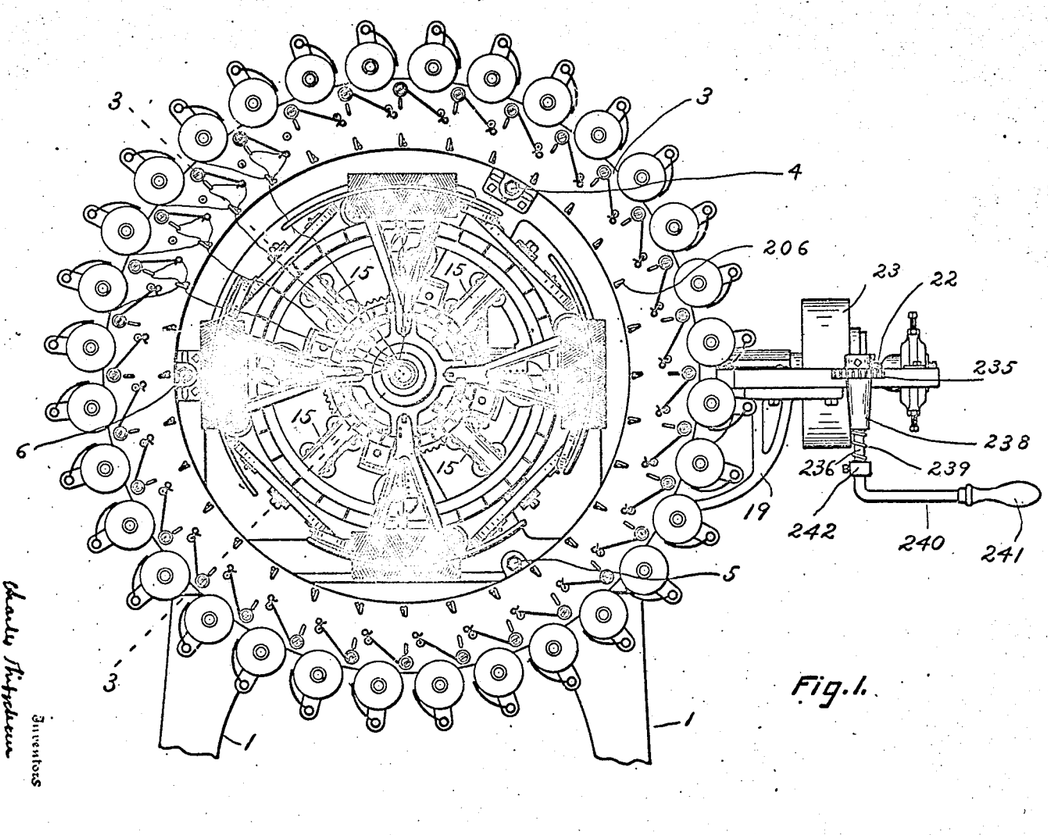
Figure 1 is a front elevation of a machine constructed in accordance with our invention.
Figure 2:
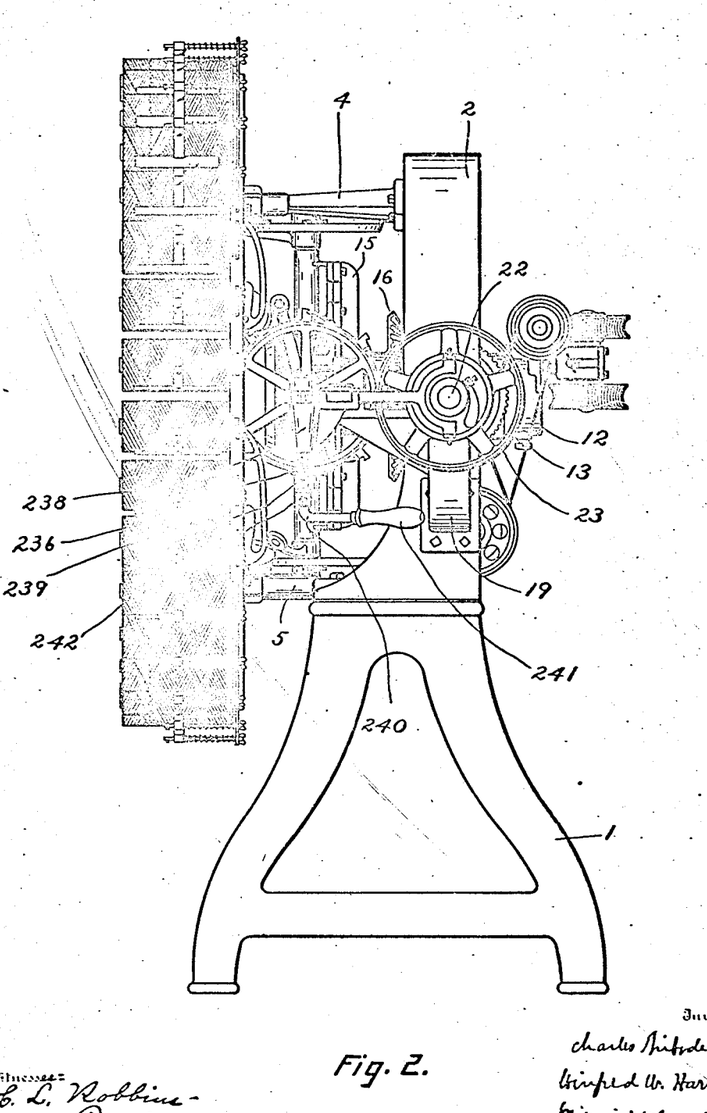
Fig. 2 is a side elevation thereof looking from a point at the right of the machine in Fig. 1.

2 represents a semi-circular, vertical frame work carried by the standards 1, (see Figs. 1 and 2).

Figure 17:
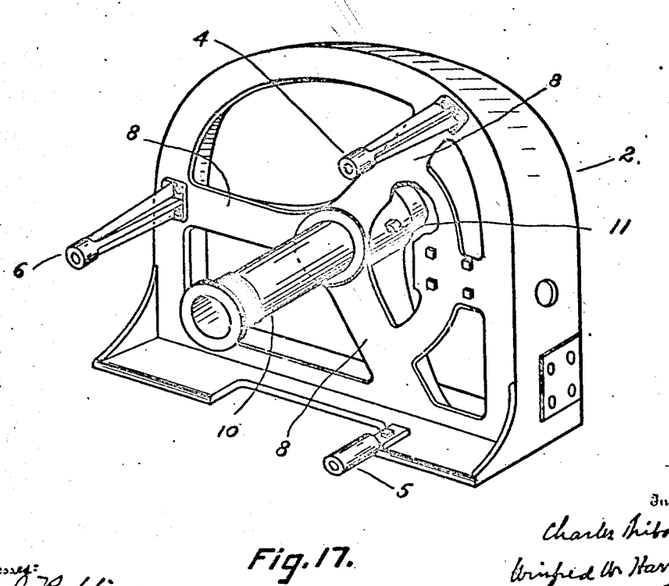
Fig. 17 is a detail perspective view of the framework shown in Fig. 16, the view being taken from the front side of said framework, showing the tubular sleeve or throat and also the arms that support the warp-ring (see Figs. 1, 2, and 6).

3 represents a vertically arranged warping connected to and carried by the framework 2 by means of arms 4, 5, and 6, (Figs. 1, 2, and 17).

Figures 11, 11A, 12, 13:
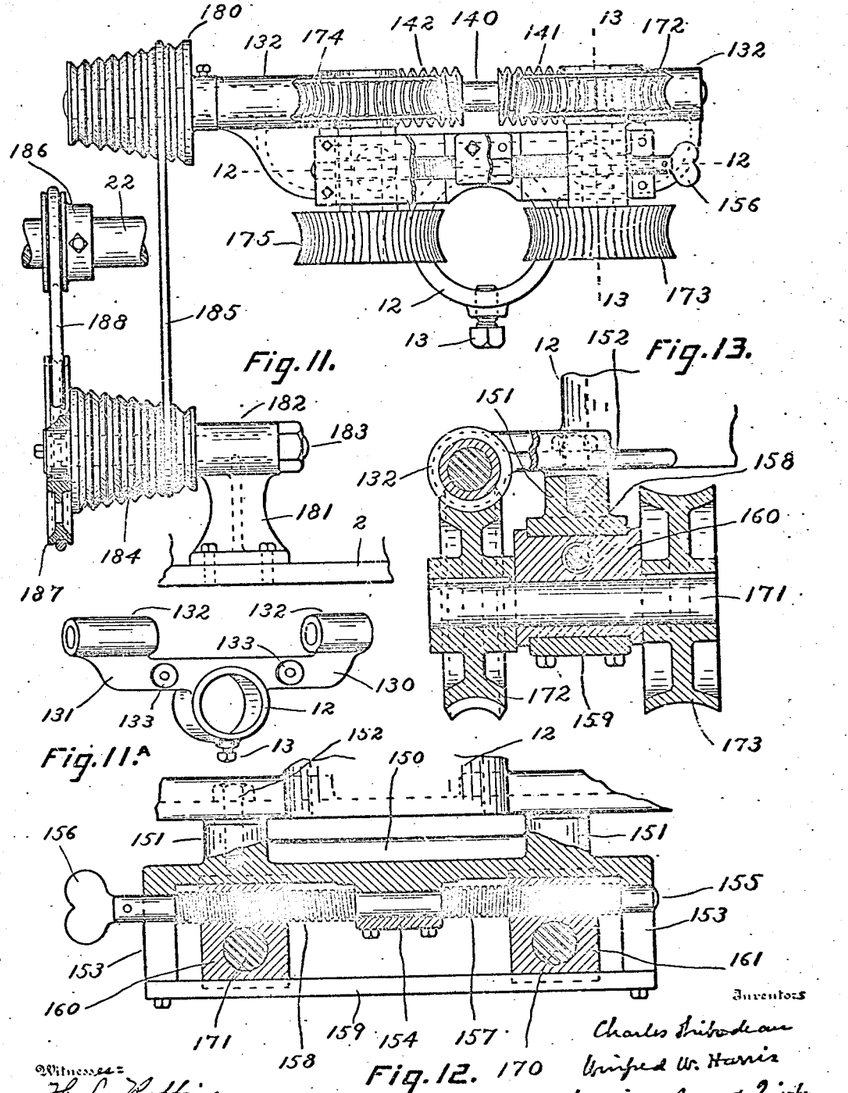
Fig. 11 is a detail view taken from a point at the rear of the machine, showing the feed and its driving mechanism.
Fig. 12 is a detail sectional view on line 12—12 of Fig. 11, showing means for adjusting the feed wheels.
Fig. 13 is a detail sectional view on line 13—13 of Fig. 11, showing one of the feed wheels and the means by which it is driven.
Figure 16:
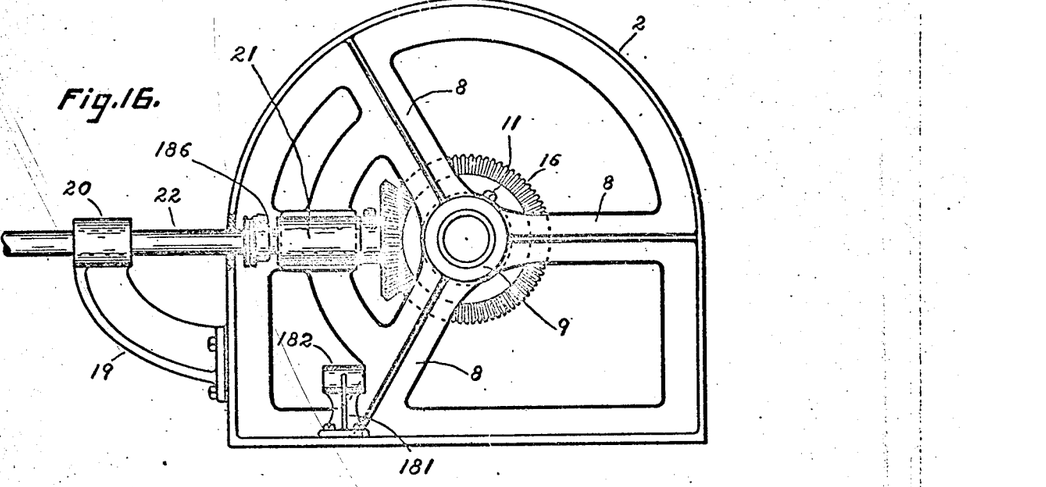
Fig. 16 is a detail perspective view of that part of the framework that supports the stationary tubular sleeve or throat, said view being taken at the rear of the machine (see Fig. 2) and showing the beveled gear carried by the hub of the spider, the power shaft and the gear on the end of the power shaft that meshes with the gear on the spider.

The framework 2 (Figs. 16 and 17) carries three arms 8 supporting at their ends a central hub 9. In this hub is arranged a tubular sleeve or throat 10 secured in place by a set-screw 11. This sleeve 10 projects beyond the rear of the frame 2 and carries at its rear end a collar 12 secured upon the end of the sleeve 10 by a set-screw 11 (Figs. 2 and 13).

14 (Figs. 3 and 15) represents a hub loosely mounted on the sleeve 10 and carrying four arms, 15, 15, 15, 15, arranged at an angle of 90° from each other (see Figs. 1, 2, 3, and 15).

16 (Figs. 2, 3, and 16) represents a beveled gear, the hub 17 of which is arranged upon the hub 14 and secured thereto by a set screw 18 whereby the hub 14 and its arms hereinafter termed the spider, are rotated.

19 (Figs. 1 and 16) represents a bracket extending out from the right-hand side of the frame 2, formed at its upper end with a hub 20. A complemental hub 21 is secured to and carried by the rear side of the frame 2.

22 represents a shaft arranged in the hubs 20 and 21 as bearings.

23 (Figs. 1, 2, and 8) represents a pulley loosely mounted on the shaft 22 and adapted to be driven by a belt from any suitable source of power. The pulley 23 is formed at its rear side with a friction drum 24 (Fig. 8) forming one member of a friction clutch.

Figure 8:
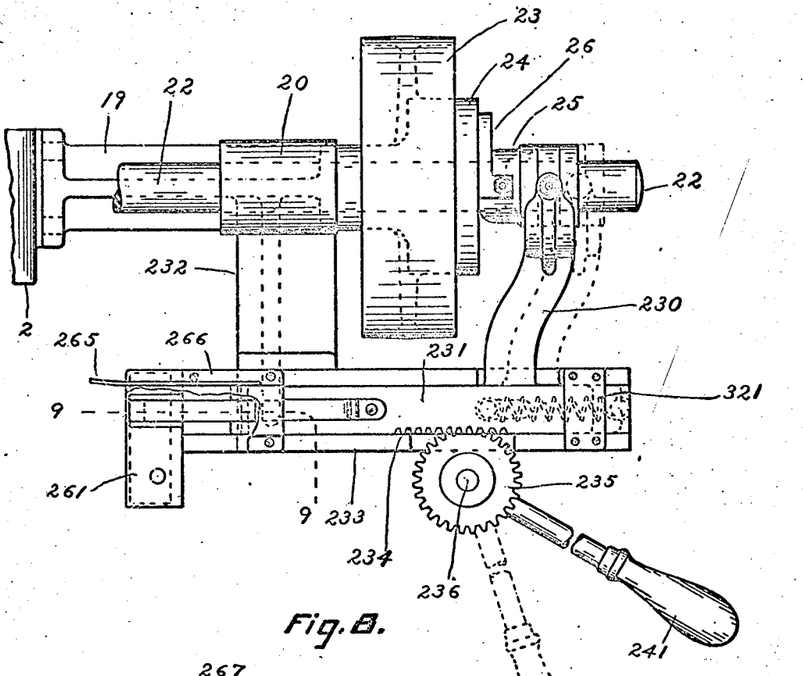
Fig. 8 is a top plan view of the shipper mechanism shown on the right-hand side of Fig. 1.

25 represents a hub mounted on the shaft 22, adapted to engage an arm 26 forming a part of the clutch mechanism and locking the clutch when the hub 25 is thrown to the left in Fig. 8, and to become substantially disengaged from the arm 26 when the hub 25 is thrown to the right in Fig. 8 and thus unlock the clutch.

The hub 25 is thrown in and out by means of an arm 230 (Fig. 8) connected to a slide 231, the latter being arranged in a suitable guideway 233 carried by an arm 232, carried by the bracket 19. The slide 231 is formed with rack-teeth 234.

235 represents a pinion arranged to engage the teeth 234. The pinion 235 is mounted upon a pintle 236, the pintle 236 being supported in a hub 238 carried by the guideway 233. The lower end of the pintle 236 (Fig. 2) is elongated and bent sharply at right angles, as at 240, terminating in a handle 241. The pinion 235 is secured to the top end of the pintle 236 and rests on the top of the hub 238 (Fig. 2).

239 represents a coiled spring arranged on the pintle between the lower end of the hub 238 and an adjustable collar 242 secured on the pintle. The arrangement is such that under normal conditions the spring 239 keeps the pinion 235 against the hub 238 and in engagement with the rack-teeth 234. If for any reason such as adjustment of parts or hand operation, it is desired to disengage the pinion 235 from the rack-teeth 234, the handle 241 is pressed upward, thus forcing the pintle 236 through the hub 238 against the tension of the spring 239, the latter serving to return the pinion into engagement with the rack-teeth 234 upon releasing the handle 241. To the inner end of the slide 231 is pivoted a latch 240. To the outer end of the slide 231 is connected a coiled spring 321 tending to pull the slide 231 to the right (see Fig. 8) thereby unlocking the clutch to disconnect the power from the shaft 22.

Each arm 15 of the spider (Figs. 3 and 15) carries at its end a hub 28 in which is arranged a short shaft or pintle 29. The end of each hub 28 is turned down at its outer end as at 30 in order to receive the hub 31 of an arm 32 (Fig. 14) that at its free end carries a roll 65. Upon the outer end of the shaft 29 is rigidly mounted a hub 33 by means of a set screw 34.

35 represents a washer engaging the outer end of each hub 33 and held against said hub by means of a cap-screw 36 tapped into the end of the shaft 29. The hub 33 is formed with spokes 60 that at their outer ends support a rim 61, the latter being provided with a series of warp-fingers 62 or plates formed with notches. In the form shown each rim 61 is provided with eight fingers 62. The spacing of the fingers 62 depends upon the particular way in which it is desired to form the shed in the warp.

To the inner end of each shaft 29 is secured a beveled gear 37 by means of a set-screw 38. The gears 37 mesh with a beveled gear 39, the hub of which in the form here shown is loosely mounted on the sleeve 10.

40 (Figs. 3, 4, and 5) represents a hub formed with screw-threads 41 on its inner wall and adapted to engage complemental screw-threads 42 on the sleeve 10, the front end of the hub 40 seating against a collar or enlargement 44 on the front end of the sleeve 10. The beveled gear 39 is secured by bolts 43 to the rear side of the hub 40 (see Fig. 3). By this arrangement, both the gear 39 and the hub 40 are rigidly secured to the sleeve 10, said gear and said hub remaining stationary with said sleeve, the screw-threads forming one means for the adjustment of said hub 40 and the parts carried thereby, as hereinafter explained.

44 on the sleeve 10 constitutes a shoulder against which the hub 40 is seated when screwed to its proper position, the shoulder preventing further movement of the hub toward the front, and maintaining the hub 40 and gear 39 against the action of the gears 37.

Figures 18, 19, 20:
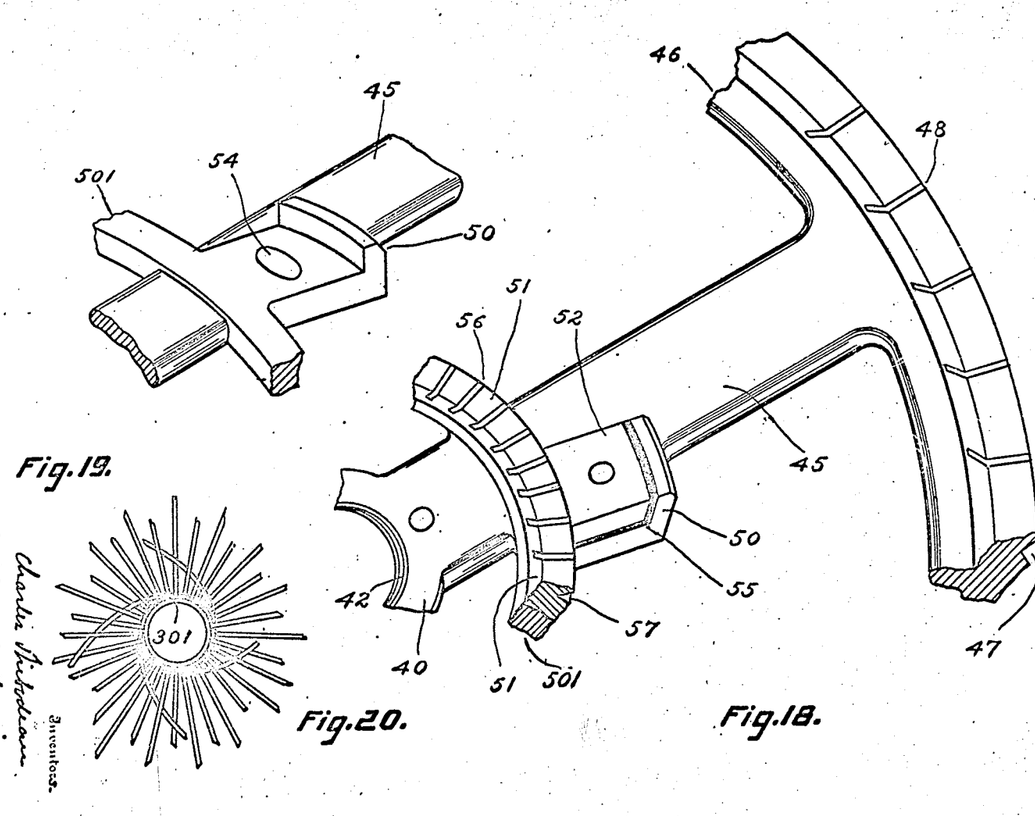
Fig. 18 is a detail perspective view showing the two concentric shuttle-rings and one of the arms by which said rings are supported.
Fig. 19 is a detail perspective view of a part of one of the arms shown in Fig. 18, showing means by which the inner shuttle-ring is connected to said arm, the outer shuttle-ring being integral with said arm.
Fig. 20 is an end view of the work as it is formed over the gage or ring, showing the arrangement of the warp with reference to the weft as it is applied to form a sheath for an inclosed tube.
Figure 21:
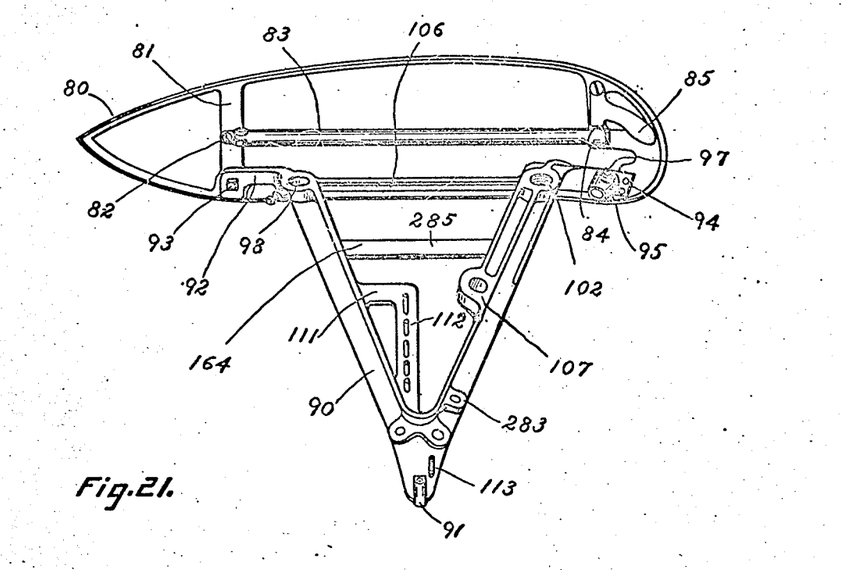
Fig. 21 is a detail perspective view of the shuttle taken from a point looking down on the shuttle, showing the frames of which the shuttle is composed and also the pivoted pin for carrying the weft.

The hub 40 (Figs. 3, 19, and 18) is formed with four radial arms 45, which in the form here shown are arranged at an angle of 90 degrees from each other, although this arrangement is not necessary.

46 represents a ring carried by the outer ends of the arms 45 and formed on its periphery with a groove 47.

48 represent inclined notches cut in the front face of the rim 46 for the reception of the warp.

Each of the arms 45 is formed on its outer side, and inside the ring 46 with a ring 501 provided with a series of shouldered lugs 50, each lug 50 arranged at an angle to the arms 45. The lug 50 is formed with a slot 54 arranged crosswise of the arm 45 and said lug.

51 represents a ring formed with four perforated ears 52, adapted to rest on the lugs 50, the ring 51 resting on the ring 501.

53 represents a bolt passing up through the slot 54 and into the perforation of the ears 52.

55 represents insulating material arranged between the ears 52, the lug 50, the arm 45 and the bolt 53 and the rings 51 and 501 (see Figs. 3, 4 and 18), in order to insulate the ears 52 and the ring 51 from the arms 45. By this arrangement the ring 51 is secured in place and may be adjusted about the axis of the hub 40 by moving the bolts in the slots 54. The ring 51 is formed with inclined slots 56 for the warp, the slots 56 being complemental to the slots 48 of the ring 46. The adjustment of the ring 51 heretofore described makes it possible to position the slots 56 in proper relation to the slots 48. The ring 51 upon its outer periphery is formed with a groove 57 corresponding to the groove 47 on the ring 46.

Figures 14, 15:
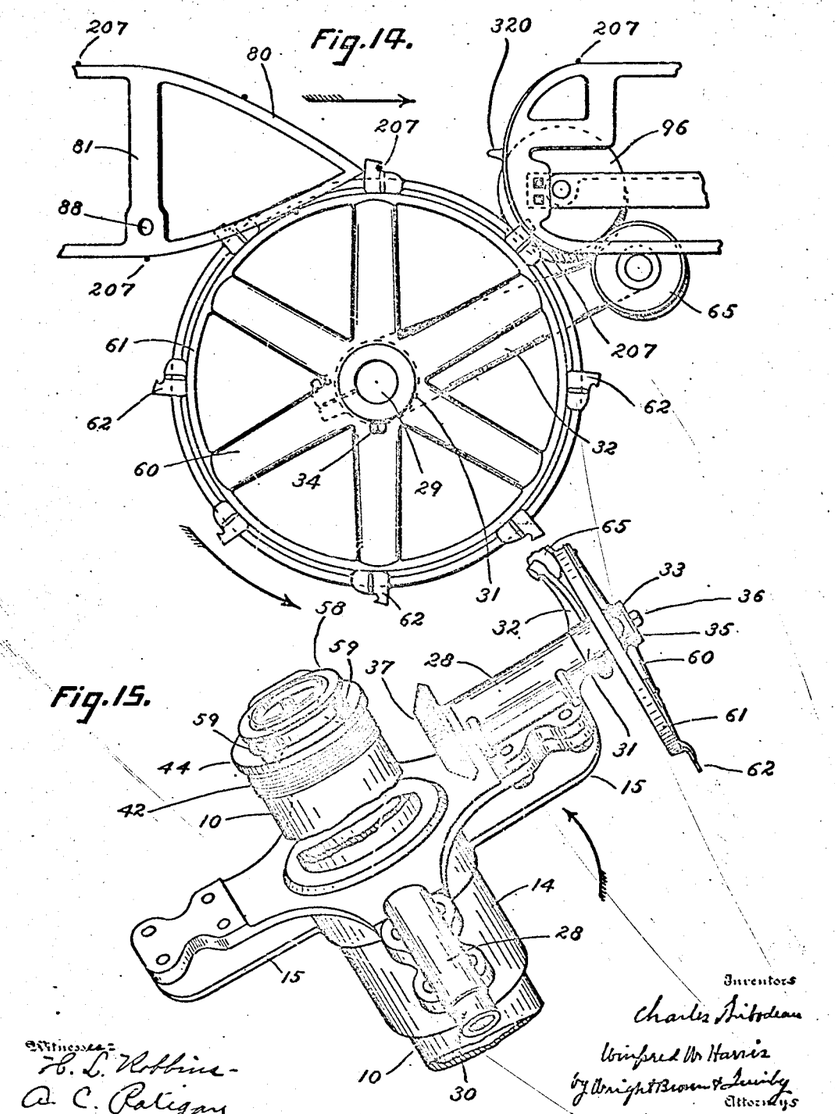
Fig. 14 is a detail view showing a pair of shuttles with a shedding wheel interposed between the nose of one shuttle and the heel of the preceding shuttle.
Fig. 15 is a detail perspective view, showing the stationary tubular sleeve or throat, the spider mounted thereon, and the gage or ring carried by the end of said sleeve or throat.

58 represents a ring provided with three pins 59, adapted to be secured in any preferred way in the front end of the sleeve 10, as shown in Fig. 15. The size of the ring 58 depends upon the size of the goods to be made, this ring being in effect a form against whose inner wall the goods are fashioned, the ring serving to determine the size of the tube to be made. In changing from one size of tube to another a corresponding change will be made in these rings, a larger or smaller ring being substituted. The outer surface of the rings 46, 51, and 58 are substantially in the same vertical plane, all of said rings being stationary.

Figure 3:
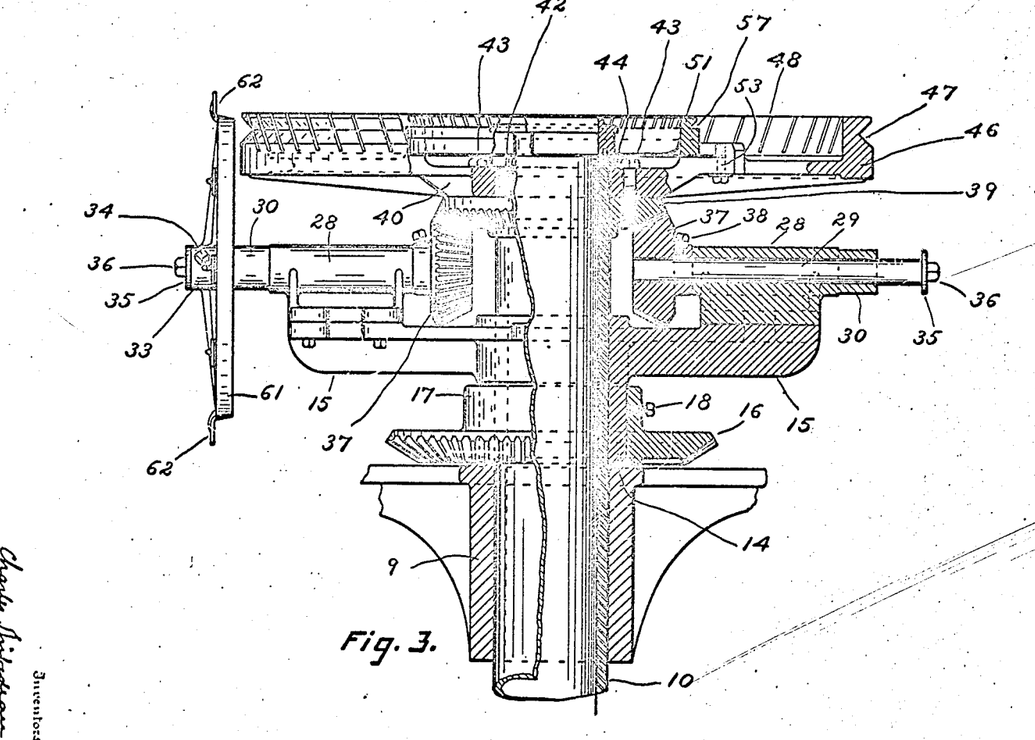
Fig. 3 is a sectional view on line 3—3 of Fig. 1, showing the two concentric shuttle-rings, one of the shedding wheels and means whereby the shedding wheels are rotated and also caused to travel around the shuttle-ring.

Referring to Fig. 3, the turning of the gear 16 causes the rotation of the spider or arms 15, thus carrying the rims 61 about the ring 46 and at the same time, due to the engagement of the gears 37 and 39, giving to the fingers 62 a rotation in the direction opposite to that in which they are being carried by the arms 15.

The loom in the form shown is provided with four shuttles. Inasmuch as these shuttles are all alike a description of one will suffice for all, it being clear from Fig. 1 that the shuttles are arranged at an angle of 90° from each other, although a different number of shuttles and a different arrangement may be employed, if desired.

Figure 4:
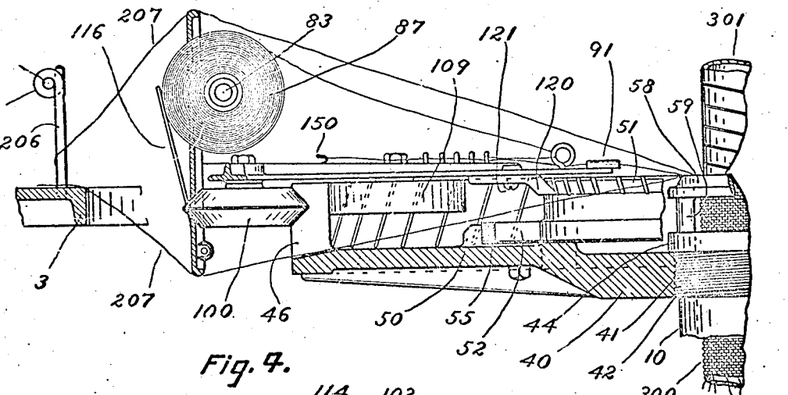
Fig. 4 is a detail view, showing in side elevation one of the shuttles and its position with relation to its associate parts, the arm connecting the two shuttle-rings being shown in section on line 4—4 of Fig. 5.
Figure 5:
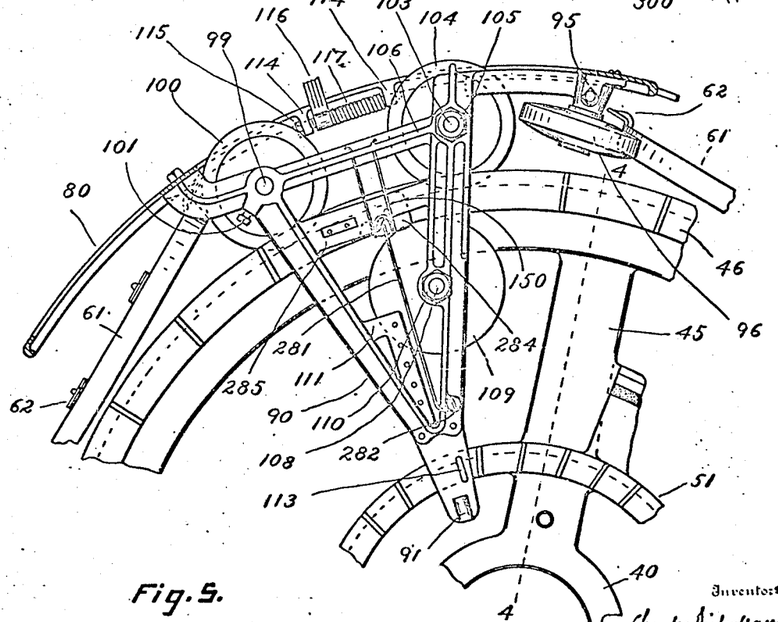
Fig. 5 is a top plan view of the parts shown in Fig. 4.

Referring to Figs. 4, 5, 21, 22, and 23, the shuttle is composed of two specially shaped frames 80, 90, secured together, the plane of the frame 80 being substantially at right angles to that of the frame 90, the frame 90 being arranged in a vertical plane and the frame 80 being bent as a segment of a circle and arranged in the space between the rings 3 and 46 (Fig. 4). The frame 80 in side elevation, has the general shape of a shuttle, while in the top plan view it is curved, as shown in Fig. 5.

Figure 22:
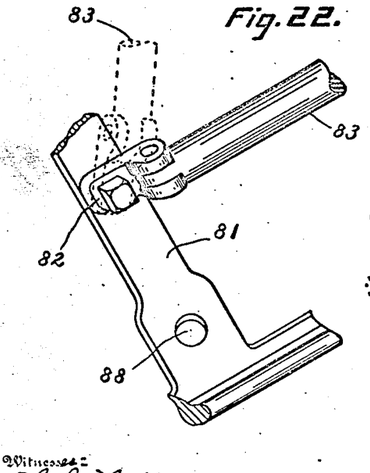
Fig. 22 is a detail view showing means for mounting the forward end of the weft pin whereby it may be swung up and away from the shuttle frame.

81 represents a cross-bar on the frame 80 near the front end thereof. On this crossbar is pivoted a lug 82. To this lug is pivoted a rod 83 (Fig. 22).

84 represents a clip finger secured on the frame 80 near the top and rear thereof, adapted to receive the end of the rod 83.

Figure 23:
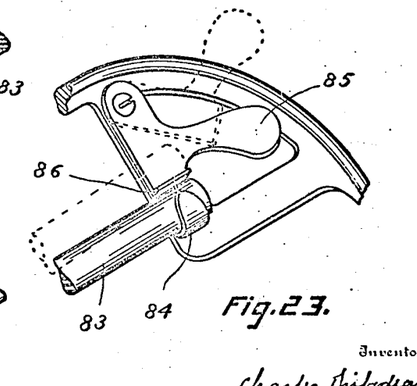
Fig. 23 is a detail view showing the free end of the weft pin and means by which it is latched in operative position.

85 represents a lever pivoted at the top and rear end of the frame 80. This lever is formed with a shoulder 86 adapted to be swung down upon the top of the rod 83 when the latter is in the clip 84, and thus maintain the rod in place. This rod serves to hold the bobbin or cop, or other form of weft 87. The frame 90 is generally V-shaped and carries a weft-guide 91 at its inner end through which the weft passes to the ring 58 (see Fig. 4). The outer or forked end of the frame 90 is formed upon the front fork with a lug 92 adapted to be secured by means of a bolt 93 to the upright 81, the bolt 93 passing through a hole 88 in said upright at the lower end thereof (Figs. 22, 23). The other fork of the framework 90 is secured by screws 94 to the rear and lower rear side of the frame 80.

95 represents a hub carried by the end of the rear fork of the frame 90. In this hub is secured the pintle of a roll 96, a set-screw 97 serving to hold said pintle, the roll 96 (Figs. 4 and 14) having its axis at an angle to what might be termed the radii of the circle in which the frame 80 of the shuttle travels, the roll 96 traveling around the ring 46.

98 represents a hub formed in the end of the forward fork of the frame 90. In this hub is arranged the pintle 99 of a roll 100, the pintle being maintained in place by means of a set-screw 101.

102 represents a complemental hub formed in the end of the rear fork of the frame 90. In this hub is arranged a pintle 103 carrying a roll 104, the pintle 103 being maintained in place by means of a nut 105.

106 represents a cross-bar connecting the two outer ends of the forks of the framework 90.

107 represents a hub formed in the rear fork of the frame 90 about midway thereof. In this hub is arranged a pintle 108 carrying a roll 109, the pintle 108 being maintained in place by means of a nut 110. The forward fork of the frame 90 carries a bracket 111 in which are arranged a series of pins 112.

113 represents a screw-eye near the inner end of the shuttle just back of the guide 91.

114, 114 represent two lugs on the bottom of the framework 80. In these lugs is arranged a pintle 115.

116 represents a tension bar pivoted on the pintle 115.

117 represents a coiled spring arranged on the pintle 115 engaging the bar 116 and arranged to yieldingly throw said bar toward the rod 83, in order to keep the bar in engagement with the weft, (see Fig. 4).

Referring to Figs. 4 and 5, the rolls 100 and 104 run in the groove 47 of the ring 46, while the roll 109 engages the opposite or inner side of the ring 46, thus compelling the shuttle to travel on the ring 46 as a track. To the under side of the frame 90 (Fig. 4) and near the inner end thereof is secured a finger 120 by means of a screw or bolt 121. The end of the finger 120 is arranged in the groove 57 of the ring 51 and serves to keep the end of the framework 90 down to prevent any lifting action.

The weft 87 (Figs. 4 and 5) passes from the bobbin or cop on the pin 83 inward through the eye 113, then outward around the spring finger 150 carried by the bar 106. The weft 87 is then led inward again about the pins 112 through the weft-guide 91, the pins 112 serving as a tension. Any other desired form of tension may be employed.

281 represents a wire, one end of which is held by a screw 282 that takes into a lug 283 (Fig. 21) on the rear fork and near the inner end of the frame 90. The front end of this wire extends outward beneath and back of the end of the spring finger 150. The end of this wire 281 tends to move rearward against a plate 284 carried by a bar 285 connecting the two forks of the frame 90. The plate 284 has a rubbing contact with the surface of the ring 46. The weft 87 engages the rear end of the wire 281 with a slight tension so that upon the breaking of the weft the end of the wire 281 will fly back against the plate of conducting material 284. The plate 284 is insulated from the cross-bar 285. The end of the wire 281 provides means for closing the circuit between the ring 46 and the shuttle upon the breaking of the weft 87.

The travel of the spider arms 15 heretofore described, causes not only the rotation of the rims 61 on their own axes, but also the movement of the said rims bodily around the ring 46 and between the latter and the ring 3. The parts are so arranged that each wheel rim 61 (Figs. 1 and 14) engages a roll 96 on the rear end of a shuttle, each rim 61 thus driving a shuttle in front of the rim 61 and around the raceway or the space between the rings 3 and 46. While the rim 61 engages the rear of a roll 96, the roll 65 is arranged just ahead of and engages the roll 96, the roll 96 being in contact with the roll 65 and rim 61. By this arrangement the shuttles are not only driven at a predetermined speed, but they are also held against racing on the downward strokes of the shuttle and maintained constantly at the speed at which the rims 61 are driven around the raceway.

The collar 12 (Figs. 2, 11 to 14) carries two arms 130, 131, (Fig. 11ᵃ), each of which has its ends formed with a hub 132, 132. Each arm 130, 131, is also formed with a perforated boss 133, 133, near the collar 12.

140 represents a worm shaft mounted in the hubs 132, 132. This shaft 140 is formed with two worms 141, 142, (Fig. 11) pitched in opposite directions and the rear of the said worms in each case engaging the inner shoulders of the hubs 132, 132.

150 (Fig. 12) represents a bracket formed with two lugs 151, 151, adapted to be secured to the bosses 133 by means of screws or bolts 152. The bracket 150 is formed with an upright 153, at each end of the bracket, and with a boss or hub 154 midway between the uprights 153.

155 represents a rod arranged in suitable bearings in the bottom of the uprights 153 and in the hub 154. This rod at one end is formed with a thumb-screw 156. This rod is also formed with a screw-thread 157 at one end and a screw-thread 158 at the other end, said threads having an opposite pitch and bearing against the ends of the boss 154 and the inner walls of the uprights 153.

159 represents a bar connected at its ends to the tops of the uprights 153 and forming with the walls of the bracket 150 a track.

160 (Figs. 12 and 13) represents a block grooved on its opposite sides, one groove being arranged to engage the bar 159, while the other groove engages the bracket 150. This block is formed with a screw-threaded aperture in which is arranged the screw-threads 158.

161 represents a complemental block arranged at the opposite end of the bracket 150. This block in like manner is grooved on opposite sides to engage with the bar 159 and with the walls of the bracket 150. The block 161 in like manner is formed with a screw-threaded aperture in which is arranged the screw-threads 157. By the means just described the blocks 160, 161 can be made to approach or recede from each other a predetermined distance by turning the thumb-screw 156 and held in such adjusted position. Each block 160, 161 carries a pintle 170, 171. The pintle 171 carries at one end a worm gear 172 arranged to mesh with the worm 141, and at its opposite end carries a feed-wheel 173. The pintle 170 carries at one end a worm gear 174 adapted to mesh with the worm 142 and at its opposite end a feed-wheel 175. The feed-wheels 173, 175 are arranged on opposite sides of the collar 12 and extend by the rear end of the sleeve 10, and are adapted to be rotated by means of their gears in a direction tending to pull a tube or woven fabric through the sleeve 10 from the front to the rear of the machine. The wheels 173, 175 by their adjustments can be moved toward and from each other to adapt themselves to goods of different sizes. To one end of the shaft 140 (Fig. 11) is secured a cone pulley 180.

181 represents a bracket mounted upon a flange of the bottom of the framework 2. This bracket is formed with a hub 182 in which is arranged a shaft 183 carrying a cone pulley 184.

185 represents a belt connecting the cone pulleys 180, 184.

186 represents a pulley fast on the shaft 22.

187 represents a complemental pulley fast on the end of the shaft 183.

188 represents a belt connecting the pulleys 186, 187. By this arrangement means are provided for driving the shaft 140 and the feed-wheels 173, 175, and also for varying the speed at which said feed-wheels shall be driven to suit the kind of work done on the machine.

The ring 3 (Figs. 1, 2, 6, and 7) is formed upon its periphery with a series of ears 200. In the form here shown the ring 3 is provided with eight of these ears in each 90°, but the number of ears may be varied as desired. Each ear carries a pintle 201 upon which is arranged a bobbin, spool, or cop 207 of warp material.

202 represents a plate mounted upon the lower end of the pintle 201, carrying at its free end a pin 203 upon which is mounted a spring-pressed plate 204, adapted to bear against the bobbin or cop as a friction or tension, the amount of tension being regulated by means of a wing nut 205 upon the pin 203, in the usual way.

206 represents a series of thread-eyes arranged upon the inner side of the ring 3, there being a thread-eye for each pintle 201.

208 represents a complemental series of thread-eyes upon the outer side of the ring 3.

210 (Fig. 6) represents a series of holes in the ring 3, near the outer side thereof and just back of the thread-eyes 208, there being a hole corresponding to each thread-eye 208. In each hole 210 is arranged a pin 211 formed with a screw-threaded central bore for receiving a screw 212.

213 represents a washer arranged about the screw 212, adapted to be pinched between the head of the screw and the top of the pin 211.

214 represents a coiled spring arranged about the pin 211, one end 215 of said spring being arranged in a suitable hole in the washer 213. The opposite end of said spring is elongated, as at 216, and formed with an eye 217 at its end adapted to receive the warp 207 and serves as a yielding warp guide, the warp holding the eye 217 against the tension of the arm 216 and spring 214 while the warp is unbroken.

221 represents a series of blocks of insulating material secured by screws 222 to the underside of the ring 3 and each formed with an aperture to receive and support a copper ring 220. These blocks 221 serve as insulated supports for said copper ring.

223 represents a series of plugs of insulating material arranged in the ring 3 immediately over the copper ring 220, there being one of these plugs corresponding to each pintle 201.

224 represents a metal pin of conducting material arranged in the copper ring 220 extending up through each plug 223 in position to be engaged by the end of the arm 216.

Figure 6:
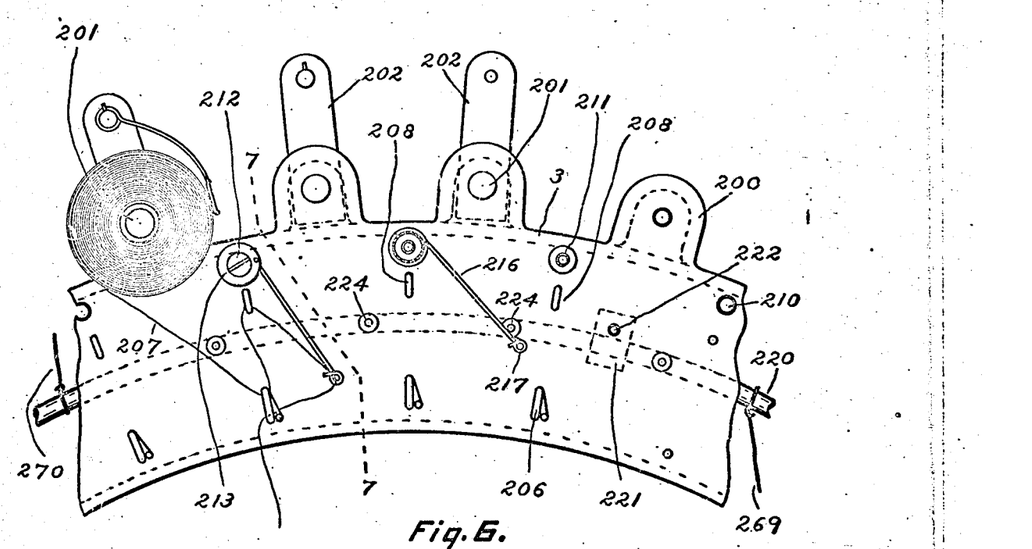
Fig. 6 is a detail view of a section of the warp-ring.
Figures 6A, 7, 7A:
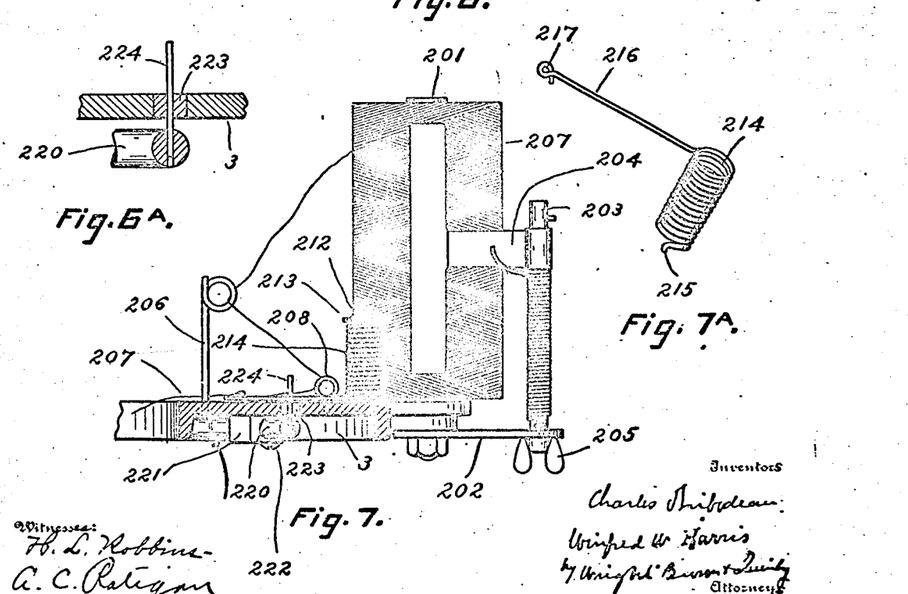
Fig. 7 is a detail sectional view on line 7—7 of Fig. 6.

Referring to Figs. 6 and 7, the warp 207 is led from the bobbin or cop inward through the thread-eye 206, then outward through the thread-eye 208, then inward and rearward through the eye 217 in the end of the arm 216, then inward and forward about and in front of the post of the thread-eye 206, inward through the notches 48 of the ring 46, through the notches 56 of the ring 51 to the edge of the ring 58 (Fig. 4) to the point where it is woven in with the weft, either as an independent article 300, or as a covering upon another article 301.

The tension of the spring 214 is such that upon the breaking of the warp 207 the arm 216 will be thrown backward until its end engages its complemental pin 224 (Fig. 6), thus closing the circuit between the copper rod 220 and the ring 3.

Figures 9, 10:
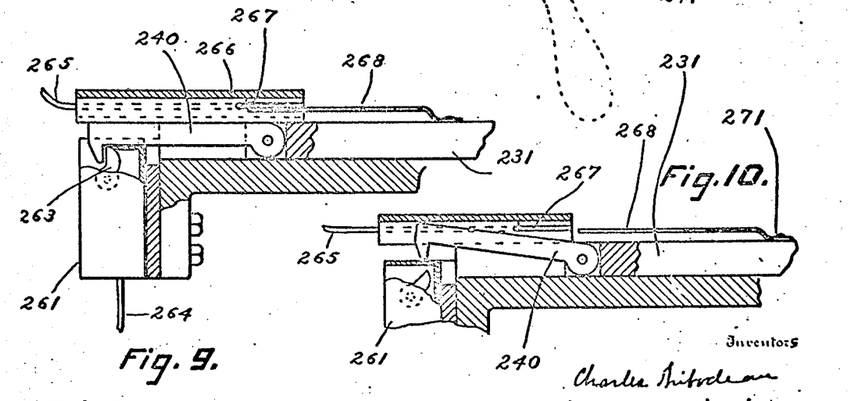
Fig. 9 is a detail sectional view on line 9—9 of Fig. 8, showing the shipper latch closed.
Fig. 10 is a view similar to Fig. 9, showing the shipper latch open.
Figures 24, 25:
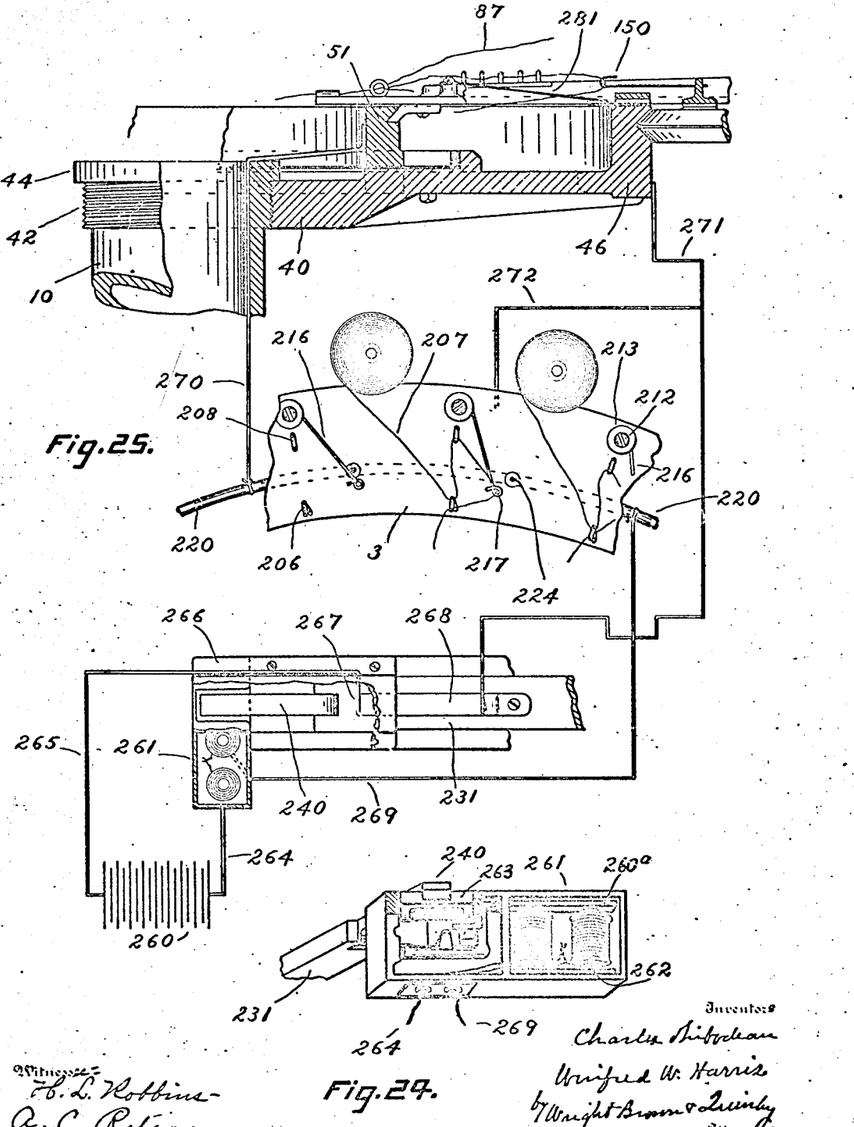
Fig. 24 is a detail view of the shipper latch and means by which it is released.
Fig. 25 is a diagrammatic view of the electric circuits governing the automatic control of the machine, the return circuits being through the machine, illustrated diagrammatically as a wire.
Figure 26:
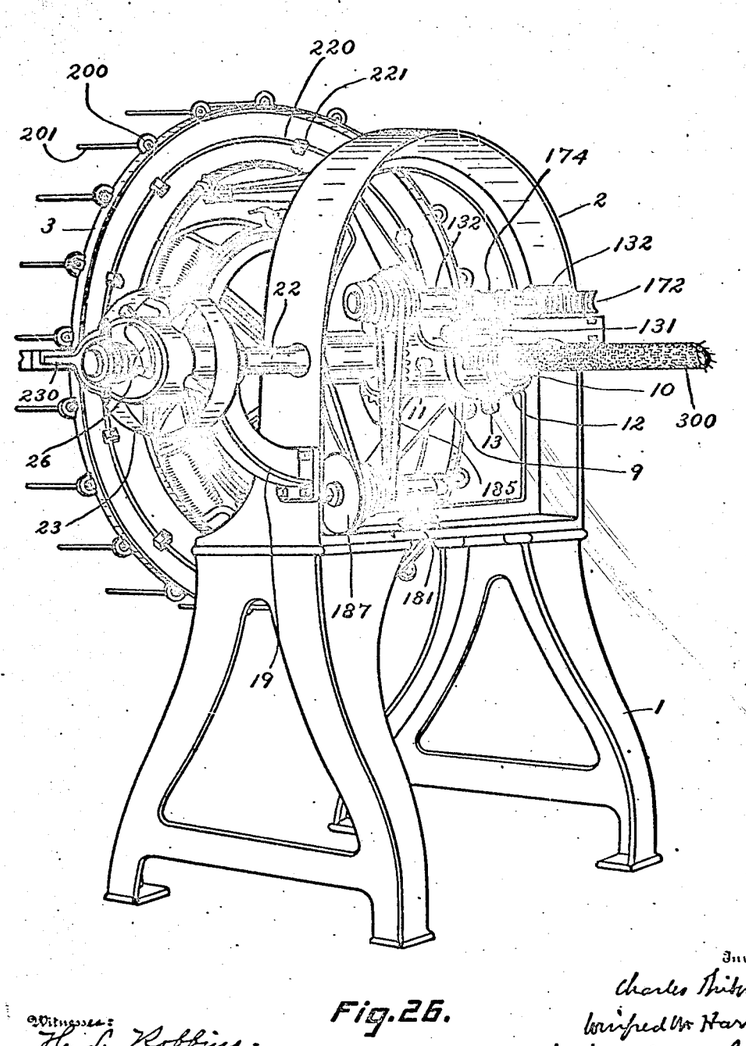
Fig. 26 is a perspective view of the machine, showing the general framework of the machine in its assembled form, as viewed from a point at the rear and one side of the machine, the warp spools and other features being omitted.

Referring to Fig. 25, 260 represents a battery, or other source of electricity. 261 represents a case containing an electro-magnet 262. This magnet has an armature 260ª that controls a trip 263, that engages the latch 240 to hold the latter when the magnet is not vitalized. When the magnet is vitalized, its armature operates to withdraw the trip 263 from the latch 240. 264 represents a wire leading from the electro-magnet winding to the battery. 265 represents a wire leading from the battery to an insulated plate or binding post 266 on the guide-way or members 233 (see Fig. 8). The end 267 of the wire 265 is exposed, as shown, and rests just over the free end of a spring 268 of conducting material, one end of said spring 268 being secured to the slide 231 (Fig. 9) in such a way that when the slide is thrown to the left (in Fig. 8) to lock the clutch, the end of the contact spring 268 comes in contact with the end 267 of the wire 265, as shown in Fig. 9, and thus closes the circuit at this point. When, however, the slide 231 is thrown to the right in Fig. 8, to unlock the clutch, the contact spring 268 is drawn out of engagement with the end 267 of the wire 265 as shown in Fig. 10, thus breaking the circuit at this point.

269 represents a wire leading from the spools of the electro-magnet to the copper rod or bar 220.

270 represents a wire leading from the copper bar 220 to the ring 51, said ring 51 as shown, being insulated from the arms 45 and therefore from the rest of the machine.

271 represents a wire connecting the ring 46 with the slide 231.

272 represents a shunt-wire running from the ring 3 to the wire 271. In practice, this part of the circuit is or may be made up of the framework of the machine. The spring-finger 281 (Figs. 4, 5, and 25) serves as a means to close the circuit between the ring 51 and the ring 46, when said spring drops upon the plate 284 upon the breaking of the weft 87, while the spring arm 216 (Fig. 25) serves as a means for closing the circuit from its rod 220 back through the wires 272, 271.

The operation of the electric part of the machine is as follows: The clutch being closed, closes the circuit between the finger 268 and the end 267 of the wire 265 (Fig. 9). The circuit is then open at two points; first, on the ring 3, which can be closed by the contact of the arm 216 with the contact pins 224; second, between the rings 51 and 46, which can be closed by the wire finger 281, the arrangement being such that the closing of the circuit upon the ring 3, or between the rings 51 and 46, or both, vitalizes the magnets 262, causing them to attract the armature so that the trip 263 is turned out of engagement with the latch 240, permitting the spring 321 to draw back the slide 231 and unlock the clutch. By this means the machine is automatically stopped upon the breaking of any warp or weft. If desired, a bell or other alarm may be introduced in the circuit to call attention to the breaking of the warp or weft as an additional precaution if for any reason the clutch should fail to unlock.

The operation of this machine is as follows: The warp and weft being arranged in their respective guides and led to the center of the machine over the ring 58, the clutch is locked and the machine started. The shedding-wheel 61 operates as in United States patent to Brown, No. 690,355, and requires no special description further than that the shedding-wheel in advance of each shuttle operates to form the shed for said shuttle and also drive the preceding shuttle.

Referring to Fig. 14, it will be seen that the fingers 62 engage alternate warps 207, raising them sufficiently to permit the nose of the shuttle to pass under them. The succeeding warp 207 engages the periphery of the shedding-wheel and thus passes under the nose of the shuttle, and so on, the warps being alternately passed about the nose of the shuttle. The warp-thread 207 on top of the preceding shuttle, as it comes off the rear end of the shuttle engages a projection 320 which holds it long enough to permit the finger 62 to pass it, thus, that particular warp passes under the nose of the next shuttle; whereas, the warp-thread 207 that comes underneath the preceding shuttle is engaged by a finger 62 and lifted so as to pass over the nose of the next shuttle. As these units are driven around the machine the rolls 65 maintain the units in their proper place to prevent racing. As the goods are made they are pulled through the machine by the feed-wheels 173, 175.

It is not intended to restrict this machine to that plan of shed formation which consists in raising alternate single warps.

Our invention does not relate to the specific number of warp-threads displaced to form a shed, but relates to the combination of mechanism recited for weaving continuous lengths of tubes.

As in the patent to Brown, No. 690,355, various warp members 207 are led to the throat in the center of the machine by suitable guide-ways, the spiders carrying the shedding wheels and the weft threads travel about the throat of the machine, raising certain warp members and depressing other warp members, and thus laying the weft between the warp members, after the manner of a shuttle. As the product is finished it is fed out from the machine and wound up on any suitable reel, not shown. Manifestly, the numbers of warp members and the number of weft members may be varied, as desired, and the shedding wheels may be arranged to depress and elevate the warp members, in any desired order.

Having thus explained the nature of our invention and described a way of constructing and using the same, though without attempting to set forth all of the forms in which it may be made, or all the modes of its use, what we claim and desire to secure by Letters Patent is:

1. In a machine for weaving tubes, a horizontally arranged throat, a form carried thereby, a hub secured to the free end of said throat carrying two concentric rings arranged in the same vertical plane, a warp ring arranged outside of said two rings, in the same vertical plane, means for conducting a warp to said form, a combined shed-forming and weft-laying means arranged to travel on the middle ring, a groove upon one side of said ring, a guide truck carried by said shed-forming and weft-laying means and arranged to travel in said groove, a roller carried by said means adapted to engage the opposite side of said ring, whereby said means is positively maintained to travel on said ring, and means for operating said shed-forming and weft-laying means about said middle ring and about the axis of the form, to form a shed and lay a weft in said shed.

2. In a machine of the class described, a horizontally arranged throat, a stationary ring arranged in a vertical plane about said throat, and formed upon one side with a groove, a shuttle mechanism positioned on said ring and provided with a guide truck adapted to rest and travel in said groove, said shuttle being also provided with a roller adapted to engage the opposite side of said ring, and means for driving said shuttle about said ring, arranged to form a shed for said shuttle.

In testimony whereof we have affixed our signatures, in presence of two witnesses.

CHARLES THIBODEAU.
WINFRED W. HARRIS.

Witnesses:
R. BULLOCK,
H. L. ROBBINS.